: 3,112,201
Patented Nov. 26, 1963

3,112,201
PROCESS FOR THE FABRICATION OF SPARKLING WINES
Fernando Romeu Saez, Calle de Xifre 23, Barcelona, Spain
No Drawing. Filed Mar. 27, 1961, Ser. No. 98,299
Claims priority, application Spain Mar. 26, 1960
5 Claims. (Cl. 99—41)

The present application is directed to a process for the fabrication of sparkling wines, that has certain advantages over the processes usually put into practice, at the same time improving the quality of the product.

The classical process of elaborating sparkling or frothy wines called "de cava" (in vaults) is well known. By said method fresh wine, obtained through fermentation of the must (grape-juice), after clarifying and adding syrup of sugar and yeast, is bottled in bottles provided with special corks called "drawings corks." The bottles are placed horizontally in vaults kept at a uniform temperature, where fermentation of the wine takes place. The second phase of the process consists of placing the bottles upside down, moving or shaking them periodically so that the dregs settle on the cork, "decollating," i.e. uncorking the bottle to eliminate the dregs, compensating for the loss of wine during this operation by the addition of the necessary quantity of a wine liqueur and sugar or brandy.

Although as this classical process produces sparkling wines of the highest quality, it, nevertheless, presents the inconvenience of being an extremely slow process, as fermentation in the vaults takes very long indeed, a fact that represents a great difficulty in obtaining substantial production, because of the necessity of extensive premises, as well as a great number of bottles.

Moreover, certain operations in this process, especially the shaking of bottles, require a specialized skilled staff with long experience.

In view of the above stated, the process called "fermentation in closed vat" is often used in said process the fermentation of the wine takes place, under certain conditions, in casks or vats hermetically closed and able to resist the pressure caused by the fermentation of the wine. This system considerably reduces the time necessary for fermentation.

The object of the present invention is to combine the advantages of both systems, effecting the first phase of fermentation in closed vat in which the wine is subjected to determined conditions of temperature, almost completing the clarifying process during which most of the dregs become separated from the wine, and effecting a final phase of bottle fermentation in which the wine becomes completely clear, thus preventing an excessive amount of residue from forming in the bottles with the consequent difficulty of elimination, and at the same time, excluding the costly phase of the shaking of bottles. The small amount of dregs and residue of fermentation collect in the hollow of a drawing cork, and there is no danger of the dregs adhering to the walls of the bottles.

According to the present process, to a conveniently selected wine is added a cultivated selected yeast of great flocculence, accustomed to work at low temperatures in totally or partially sterile means, and this wine is subjected to fermentation in large metal vessels, vitrified inside, provided with hermetic closing means and capable of resisting pressure up to 4 atmospheres. These vessels are supplied with means to vary and regulate the inside temperature, preferably by means of a jacket, through which hot water or a refrigerant mixture can be circulated, as required.

The fermentation of the sugar added is initiated by keeping the wine at a temperature, at most 8° C., which is kept uniform until an interior pressure of 1.5 atmospheres is reached, when the temperature is lowered to 0° C., by means of the circulation of an appropriate refrigerant mixture through the jacket of the vessels, thus paralyzing the fermentation for 24 hours.

After this time, fermentation is resumed by raising the temperature up to a maximum of 8° C. by means of circulating hot water through the above mentioned jacket of the vessels, maintaining this temperature until a pressure of 2.5 atmospheres is reached in the interior of the vessels. When this pressure is reached, the temperature is again decreased to 0° C. to produce another stop in fermentation which is prolonged for 48 hours, after which the temperature is once more raised, without exceeding 8° C., to resume fermentation again until 3 atmospheres of pressure are reached. With this the first phase of fermentation is accomplished.

An energetic decrease of temperature is then produced to 10° below zero. This condition is maintained for a fortnight or as much as 15 days, thus producing the clarification of the wine, which is now partially sparkling or frothy. After this clarification and keeping the same low temperature mentioned, the partially sparkling wine is separated simply by decantation, leaving the dregs at the bottom of the vessels, and proceeding with the bottling operation, which is performed isobarically by appropriate bottling machines. By "isobarically," it is meant that the pressure inside the vessels is maintained by the introduction of air pressure to compensate for removed liquid.

The bottles, corked with a "drawing cork" that is hollowed out inside, are heaped up vertically upside down in cellars or vaults provided with means for regulating the climate artificially, whereby, under a temperature of 12° C., the last phase of fermentation takes place. Said last phase is prolonged until a pressure of 4.5 atmospheres is reached. After this fermentation is finished, the temperature of the premises is reduced to 0°, up to the moment of decollation of the bottles with the object of removing the dregs and residue of this second phase. Owing to the effect of clarification in the first phase of fermentation, the residue is almost non-existent and can be completely collected in the hollow of the cork, thus eliminating the danger of the dregs adhering to the walls of the bottle, and, at the same time, eliminating the shaking operation.

Finally, the bottles are filled up as in the classical process, adding the appropriate substances to give the wine aroma or bouquet, after which the final corking is effected.

*Example*

Sugar is added to wine (preferably wine of the Ampurdan, white or red) in the quantity of 20 gr. of sugar per liter of wine. This wine is inoculated with 1% of cultivated yeast of Saccharomyces ellipsoideus and in an internally vitrified (glass lined) hermetic container capable of withstanding internal pressures up to four atmospheres. The capacity of the container is preferably 2500 litres. Said container is provided with an external jacket through which hot water or refrigerant can be passed to regulate the temperature of the contents.

The inoculated wine is maintained at 5° C. (this temperature may be at most 8° C.) for the initiation of the fermentation of the sugar until an internal pressure of 1.5 atmospheres is reached. In a 2500 liter container having 2500 liters of wine initially, this pressure is reached in about 14 hours.

At this time, a refrigerant consisting of 20% salt in water, cooled to −12° C., is circulated in the external jacket of the container to maintain the internal temperature of said container at 0° C. for 24 hours, thus terminating the fermentation for such time.

Thereafter fermentation is resumed by raising the internal temperature to 5° C. by circulating water at a temperature of 60° C. through the external jacket and maintaining said temperature until an internal pressure of 2.5 atmospheres is reached. At this time the internal temperature is again decreased to 0° C. by the circulation through the external jacket of the same refrigerant at the same temperature as previously employed and the temperature is maintained at 0° C. for 48 hours, thus preventing fermentation for this period of time.

The temperature is once more raised in the manner set forth above to 5° C. and maintained at that temperature until an internal pressure of three atmospheres is built up. With this the first stage of the fermentation is accomplished.

The internal temperature is then reduced to 10° C. below zero by circulating the same refrigerant through the jacket. By means of said circulating refrigerant the internal temperature is maintained at 10° C. below zero for a fortnight, whereby the wine is clarified, said wine now being partially sparkling or frothy. The partially sparkling wine is now decanted, leaving the dregs at the bottom of the container.

Said decanted partially sparkling wine is bottled isobarically, i.e. maintaining a pressure of two atmospheres within each bottle, through any usual bottling machine for sparkling beverages. The bottles are corked with an ininternally hollowed out drawing cork and store vertically upside-down in a vault maintained at 12° C. until a pressure of 4.5 atmospheres is attained within said bottles. The temperature is then reduced to 0° C. The hollowed out corks, with any dregs which may have settled therein, are removed. The bottles are filled and finally corked.

In the preceding example wine of the Ampurdan was employed as the wine. The identical process is equally applicable to other wines, for example Burgundy, Port, Muscatel, Sherry, and especially to wines, white or red, of various Spanish districts, such as Tarragona, Panadés, Rioja and La Mancha, and others. Similarly, other yeasts which provide great flocculence and which ferment at low temperatures in totally or partially sterile media, for example, *Saccharomyces validus, Saccharomyces intermedius* and *Saccharomyces cerevisiae,* can be employed in the same manner as the species of Saccharomyces illustrated in the example.

I claim:

1. A process for the elaboration of sparkling wine from non-sparkling wine in two fermentation stages: (I) maintaining wine, to which sugar and yeast have been added, in a hermetically sealed zone at a controlled fermentation temperature of at most 8° C. until a pressure of about 1.5 atmospheres is developed in the zone, cooling the product to 0° C. for about twenty-four hours, heating the cooled product to a fermentation temperature of at most 8° C. to reestablish the fermentation until the pressure in said zone reaches 2.5 atmospheres, cooling the resulting product to 0° C. for about forty-eight hours, heating the thus cooled product to a fermentation temperature of at most 8° C. until a pressure of 3 atmospheres is attained in said zone, and cooling the resulting partially fermented wine intensely while clarifying same for about 15 days; and then (II) subjecting the resulting partially fermented wine to a second fermentation by bottling the clarified partially fermented wine in bottles closed with internally-hollowed drawing corks, storing the bottles in an inverted position for further fermentation and purification, decollating to drain the final dregs when the wine in said bottles has become sparkling wine, replacing material removed from the bottles with wine liqueur and finally recorking said bottles.

2. A process for the elaboration of sparkling wine from non-sparkling wine which comprises fermenting the non-sparkling wine in two fermentation stages: (I) maintaining wine, to which sugar and yeast have been added, at a controlled fermentation temperature of at most 8° C. within a hermetically sealed zone and interrupting the resulting fermentation, when said fermentation has developed sufficiently, by cooling the wine to approximately —10° C. for about 15 days while maintaining in the zone the pressure developed by fermentation, concurrently settling dregs in said zone; and then (II) subjecting the resulting partially fermented wine to a second fermentation by bottling the clarified partially fermented wine in bottles closed with internally-hollowed drawing corks, storing the bottles in an inverted position for further fermentation and purification, decollating to drain the final dregs when the wine in said bottles has become sparkling wine, replacing material removed from the bottles with wine liqueur and finally recorking said bottles.

3. Process for making sparkling wine from non-sparkling wine which comprises fermenting the non-sparkling wine in two fermentation stages: (I) maintaining wine, to which sugar and yeast have been added, at a controlled fermentation temperature of at most 8° C. in a hermetically closed zone until a pressure of about 1.5 atmospheres is effected, cooling to terminate fermentation, reheating to maximally 8° C until a pressure of about 2.5 atmospheres is effected, recooling to terminate fermentation, reheating to maximally 8° C. until a pressure of 3 atmospheres is effected, recooling to about —10° C. for about a fortnight, and then (II) subjecting the resulting partially fermented wine to a second fermentation by bottling the clarified partially fermented wine in bottles closed with internally-hollowed drawing corks, storing the bottles in an inverted position for further fermentation and purification, decollating to drain the final dregs when the wine in said bottles has become sparkling wine, replacing material removed from the bottles with wine liqueur and finally recorking said bottles.

4. Process for making sparkling wine from non-sparkling wine which comprises fermenting the non-sparkling wine in two fermentation stages: (I) maintaining wine, to which sugar and yeast have been added, at a controlled fermentation temperature of at most 8° C. within a hermetically sealed zone and in contact with a glass lining until a pressure of about 1.5 atmospheres is developed in the zone, cooling the product to 0° C. for about twenty-four hours, heating the cooled product to a fermentation temperature of at most 8° C. to reestablish the fermentation until the pressure in said zone reaches 2.5 atmospheres, cooling the resulting product to 0° C. for about forty-eight hours, heating the thus cooled product to a fermentation temperature of at most 8° C. until a pressure of 3 atmospheres is attained in said zone, and cooling the wine to approximately —10° C. for about fifteen days while maintaining in the zone the pressure developed by fermentation, concurrently clarifying; and then (II) subjecting the resulting partially fermented wine to a second fermentation by isobarically bottling said clarified partially fermented wine in bottles closed with internally-hollowed drawing corks, said isobaric bottling effected by injecting air under pressure into said bottles and said zone as needed to maintain a constant internal pressure therein, storing said bottles in an inverted position for further fermentation and purification, decollating to drain the final dregs when the wine in said bottles has become sparkling wine, replacing material removed from the bottles with wine liqueur and finally recorking said bottles.

5. Process for making sparkling wine from non-sparkling wine which comprises fermenting the non-sparkling wine in two fermentation stages: (I) maintaining wine, to which sugar and yeast have been added, at a controlled fermentation temperature of maximally 8° C. within a hermetically closed zone until a pressure of about 1.5 atmospheres is effected, cooling to terminate fermentation, reheating to maximally 8° C. until a pressure of about 2.5 atmospheres is effected, recooling to terminate fermentation, reheating to maximally 8° C. until a pressure of 3 atmospheres is effected, recooling to about —10° C. for about 15 days; and then (II) subjecting the resulting partially fermented wine to a second fermentation by bottling the clarified partially fermented wine in bottles closed with internally-hollowed drawing corks, storing the bottles in an inverted position for further fermentation and purification at a temperature of about 12° C. until the pressure due to further fermentation, which takes place in the bottles, rises to about 4.5 atmospheres, cooling the bottles and contents to about 0° C., decollating to drain the final dregs, replacing the material removed from the bottles with wine liqueur and finally recorking said bottles.

References Cited in the file of this patent

UNITED STATES PATENTS 927,944    Charmot _____ July 13, 1909

OTHER REFERENCES

Herstein et al.: "Chemistry and Technology of Wines and Liquors," 1948, D. Van Nostrand Co., N.Y., pp. 206–215.

Cruess: "The Principles and Practice of Wine Making," 1946, Mack Printing Co., Easton, Pa., pp. 269–281.